(12) United States Patent
Crosland et al.

(10) Patent No.: US 6,937,061 B1
(45) Date of Patent: Aug. 30, 2005

(54) ADDRESS DECODER FOR PROGRAMMABLE LOGIC DEVICE

(75) Inventors: Andrew Crosland, Aylesbury (GB); Roger May, Bicester (GB); Stephane Cauneau, London (GB); Andrew Draper, Chesham (GB); Edward Flaherty, Kingston Bagpuize (GB)

(73) Assignee: Altera Corporation, San Jose, CA (US)

( * ) Notice: Subject to any disclaimer, the term of this patent is extended or adjusted under 35 U.S.C. 154(b) by 66 days.

(21) Appl. No.: 10/751,229

(22) Filed: Dec. 30, 2003

(51) Int. Cl.[7] .......................... H03K 19/173
(52) U.S. Cl. ................. 326/38; 326/47; 326/105
(58) Field of Search ................. 326/37–47, 105

(56) References Cited

U.S. PATENT DOCUMENTS 5,970,254 A * 10/1999 Cooke et al. ............. 712/37

* cited by examiner

*Primary Examiner*—Anh Q. Tran
(74) *Attorney, Agent, or Firm*—Townsend and Townsend and Crew LLP

(57) ABSTRACT

A programmable logic device includes a gate array formed from programmable logic elements, and at least one address decoder structure. The address decoder has a first stage, for receiving bits of an address, and for masking out a first group of least significant bits of said address; a second stage, for comparing a second group of most significant bits of said address with respective comparison bits; and a third stage, for providing an output when all of the bits in said second group of bits of said address match their respective comparison bits. Thus, the address decoder can determine when a received address falls within a range of addresses associated with the address decoder. Multiple address decoders may be provided at spaced apart locations within the gate array, and one address decoder can be associated with each slave device implemented in the gate array. The programmable logic device may be used to implement a bus structure, with a bus master which may be in the form of an embedded processor. One of the multiple address decoders can then be associated with each slave device in the bus structure.

18 Claims, 3 Drawing Sheets

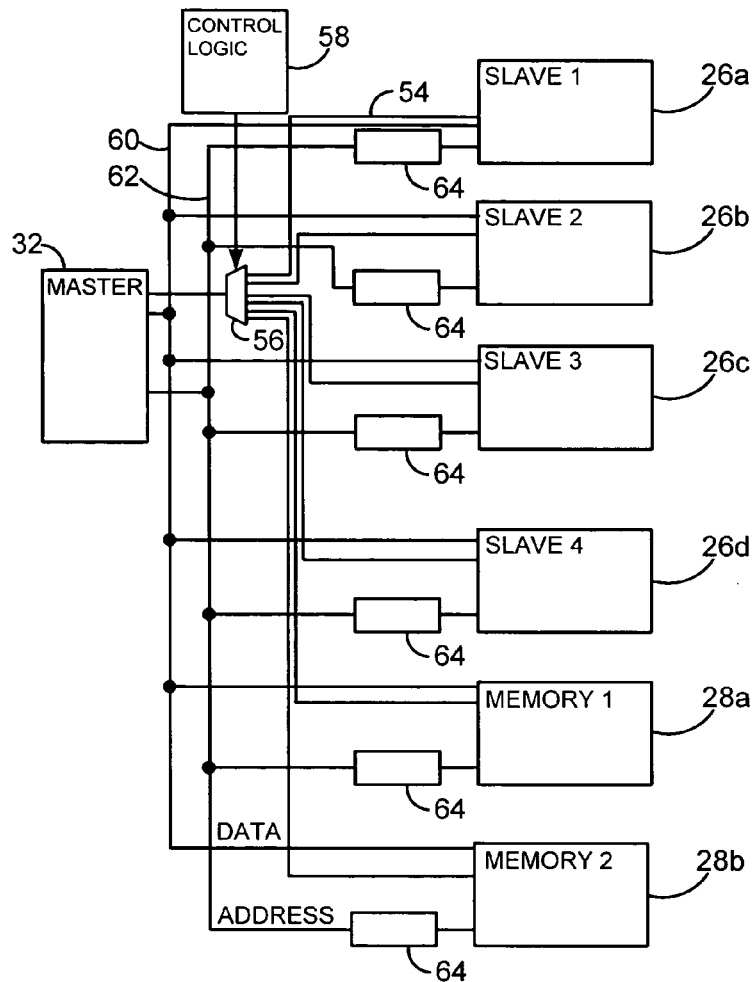

ADDRESS DECODER FOR PROGRAMMABLE LOGIC DEVICE

BACKGROUND OF THE INVENTION

This invention relates to a programmable logic device (PLD) or field programmable gate array (FPGA). In particular, it relates to the implementation of an address decoder in such a device.

A programmable logic device is an integrated circuit, which includes a large number of logic elements, usually arranged in the form of an array. After manufacture, these logic elements can be combined, by programming the possible interconnections between the logical elements in a particular way, so that the device performs a particular desired set of functions.

In order to allow the required interconnections to be made, the programmable logic device includes a routing structure. The routing structure allows communication between the different logic elements in the array.

After manufacture of the programmable logic device, functions are allocated to the logic elements, and the interconnections between the logic elements are programmed, in such a way that the device performs its intended overall function.

In many cases, it is useful to use a programmable logic device to implement a device which operates with a bus structure. That is, multiple functional blocks are implemented within the programmable logic device and are interconnected such that any one of a first group of said blocks, referred to as master devices, can initiate data transfer to or from any one of a second group of said blocks, referred to as slave devices.

In order for a bus structure of this type to operate, it is necessary for transferred data to be sent with an appropriate address, and the address must then be decoded to ensure that data is read from, or written to, the intended functional block. One way of implementing this address decoder in a programmable logic device is to use the logic elements. However, this uses the logic elements somewhat inefficiently, while preventing them from being used for other purposes.

SUMMARY OF THE INVENTION

According to the present invention, there is provided a programmable logic device, comprising a gate array formed from programmable logic elements, and at least one address decoder structure. The address decoder is preferably made up of a first stage, for receiving bits of an address, and for masking out a first group of least significant bits of said address; a second stage, for comparing a second group of most significant bits of said address with respective comparison bits; and a third stage, for providing an output when all of the bits in said second group of bits of said address match their respective comparison bits.

Thus, the address decoder can determine when a received address falls within a range of addresses associated with the address decoder.

In preferred embodiments of the invention, multiple address decoders are provided at spaced apart locations within the gate array, and one address decoder can be associated with each slave device implemented in the gate array.

The programmable logic device may be used to implement a bus structure, with a bus master which may be in the form of an embedded processor. One of the multiple address decoders can then be associated with each slave device in the bus structure.

BRIEF DESCRIPTION OF DRAWINGS

FIG. 3 is a functional block diagram showing in more detail a bus structure of the programmable logic device of FIG. 1.

FIG. 4 illustrates schematically the addresses allocated to devices in the programmable logic device of FIG. 1.

DETAILED DESCRIPTION OF PREFERRED EMBODIMENTS

Figure 1:
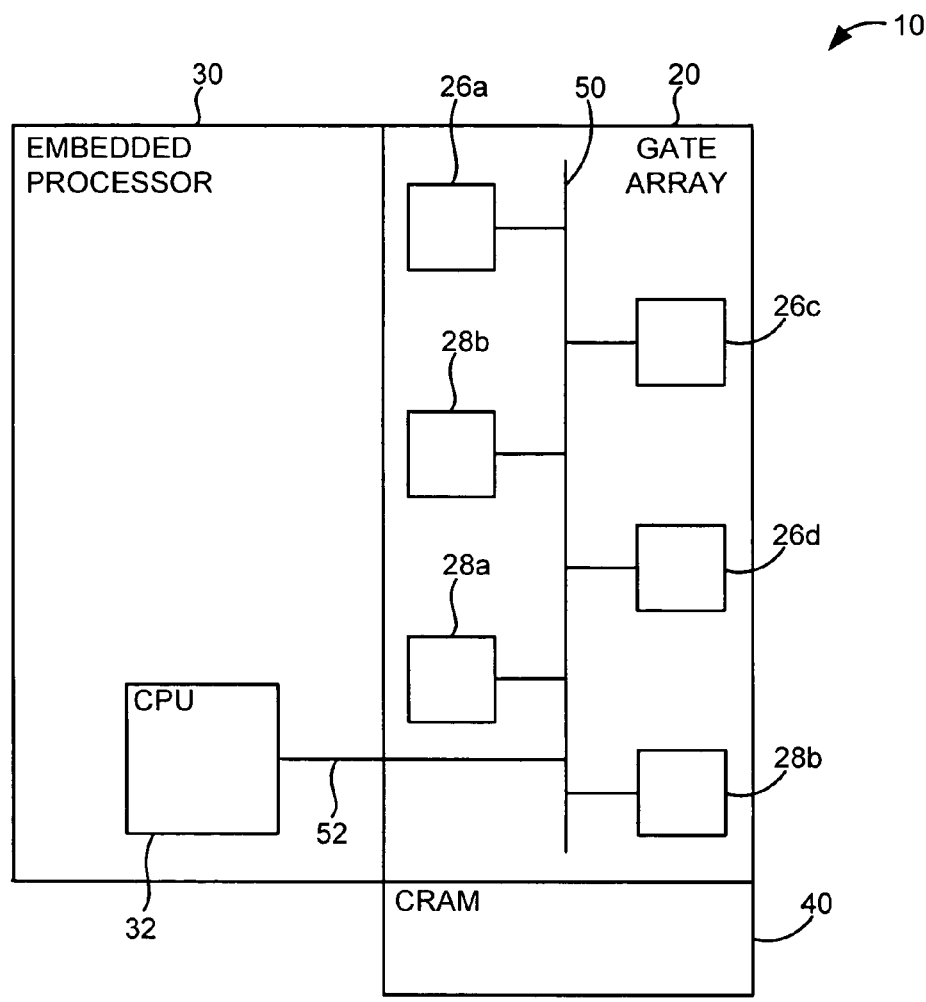
FIG. 1 is a block schematic diagram of a programmable logic device in accordance with the present invention.

FIG. 1 shows a programmable logic device 10 according to a first embodiment of the invention. In this case, the programmable logic device 10 includes a field programmable gate array 20 and an embedded processor 30. However, in other embodiments of the invention, the programmable logic device may include only a field programmable gate array without an embedded processor.

The general form of the programmable logic device 10 is known to the person of ordinary skill in the art, and will not be described here in detail except as far as is necessary for an understanding of the present invention.

Figure 2:
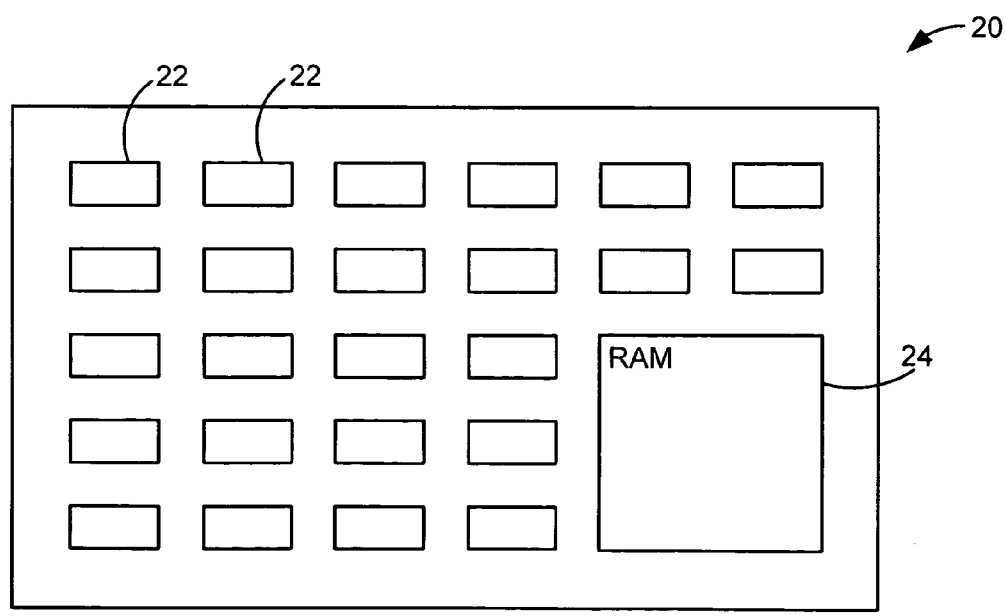
FIG. 2 is a more detailed block schematic diagram of the gate array of the device of FIG. 1.

FIG. 2 shows in more detail the form of the field programmable gate array 20. The array 20 is made up of logic array blocks 22 which are arranged in horizontal rows and vertical columns. The logic array blocks can be programmed to perform specific functions which are allocated to them in use. The logic array blocks are interconnected by means of an interconnect structure (not shown), which can be programmed to connect together the logic array blocks which need to operate together to perform specific functions.

The logic array blocks and the interconnect structure are programmed by means of configuration data, which is stored in a configuration memory (configuration RAM, or CRAM) 40, as shown in FIG. 1.

The logic array blocks 22 may be made up of multiple logic elements, which can be programmed separately, as described above. Also, some of the logic array blocks 22 may be in the form of memory blocks, which can be used to store data. For example, logic array blocks 22 within the array may be used for temporary data storage, while a larger amount of memory capacity may be provided by way of a separate random access memory RAM 24. The RAM 24 may be of a size which does not allow it to fit into the array in the same way as the other logic array blocks 22, but it may be connected to the interconnect structure in the same way.

As is well known, the device is manufactured as described above and then, by altering the configuration data stored in the CRAM 40, the functionality of the device can be changed.

FIG. 1 is a functional block diagram showing the way in which various elements of the gate array 20 have been combined, by appropriate programming of the interconnect structure, into functional blocks 26a, 26b, 26c, 26d. In addition, parts of the RAM 24 have been formed, by the programming of the interconnect structure, into functional blocks 28a, 28b.

As shown in FIG. 1, the functional blocks 26a, 26b, 26c, 26d, 28a, 28b are connected by a bus structure 50.

The embedded processor 30 includes, amongst other things, a processing unit, CPU, 32, which has a connection to the bus structure 50 by way of a bridge 52.

In the device illustrated in FIG. 1, the CPU 32 acts as a bus master, while the functional blocks 26a, 26b, 26c, 26d, 28a, 28b act as slave devices. That is, the CPU initiates data transfers on the bus 50, either to allow data to be processed in the functional blocks 26a, 26b, 26c, 26d or to allow data to be written into or read from the memory blocks 28a, 28b.

FIG. 3 is a further block diagram showing in more detail the operation of the bus structure 50. Thus, FIG. 3 shows the CPU 32 acting as the master device, the functional block 26a acting as a first slave device, the functional block 26b acting as a second slave device, the functional block 26c acting as a third slave device, the functional block 26d acting as a fourth slave device, the memory block 28a acting as a first memory device, and the memory block 28b acting as a second memory device.

When data is to be transferred from one of the functional blocks 26a, 26b, 26c, 26d or memory blocks 28a, 28b to the CPU 32, it is transferred over a respective data line 54, through a multiplexer 56 which operates under the control of a logic block 58 to the CPU 32.

When data is to be transferred to one of the functional blocks 26a, 26b, 26c, 26d or memory blocks 28a, 28b from the CPU 32, it is made available on a data line 60 to all of those blocks. An address signal is also sent on an address line 62 to a respective address decoder 64 associated with each of the blocks, and each address decoder 64 determines whether the data is intended for its associated block.

FIG. 4 shows the way in which addresses may be allocated to the slave devices 26a, 26b, 26c, 26d and the memory blocks 28a, 28b. FIG. 4 uses the conventional hexadecimal notation, in which each character of an address represents four address bits, with the characters 0–9 representing the address bits 0000–1001 respectively, and the characters a–f representing the address bits 1010–1111 respectively, and with the most significant bits of the address at the left of the address. Thus the first memory device 28a has addresses in the range 00000000–000fffff, the second memory device 28b has addresses in the range 00100000–001fffff, the first slave device 26a has addresses in the range ffc00000–ffcfffff, the second slave device 26b has addresses in the range ffd00000–ffdfffff, the third slave device 26c has addresses in the range ffe00000–ffefffff, and the fourth slave device 26d has addresses in the range fff00000–ffffffff. Each of these devices therefore has five hexadecimal characters, or twenty bits, to define the addresses within it. This means that each of the address regions shown in FIG. 4 has a size of 1 Mbyte. In this illustrated embodiment of the invention, this can be regarded as the minimum possible size for an address region, although address regions can be larger than this, in multiples of 1 Mbyte.

Each of the address decoders 64 must therefore determine whether any address, specified by the master device 32, is one of the addresses in its associated memory region.

As mentioned above, each of the addresses is represented by eight hexadecimal characters, that is, thirty-two bits. Further, each of the slave devices 26a, 26b, 26c, 26d and the memory blocks 28a, 28b is indicated by the first three hexadecimal characters, that is, the twelve most significant address bits, with the specific address within the device then being indicated by the remaining five hexadecimal characters, that is, the twenty least significant address bits.

Figure 5:
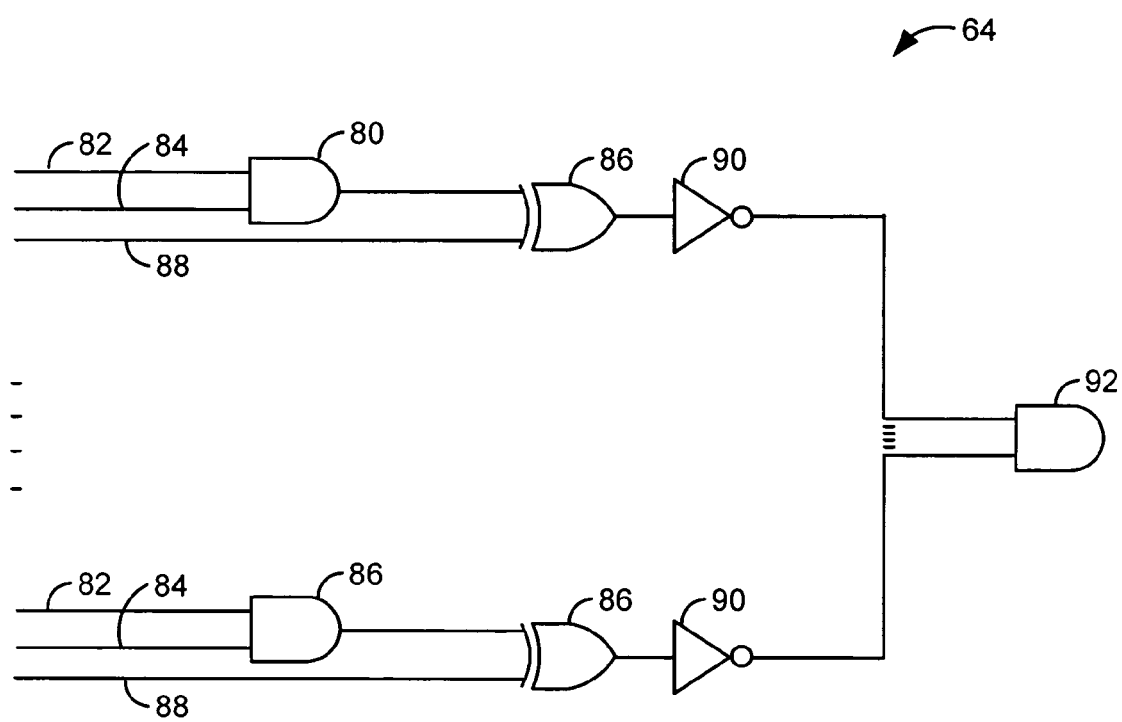
FIG. 5 shows in more detail a part of the address decoder in the bus structure of FIG. 3.

FIG. 5 shows in detail the structure of one of the address decoders 64 which allows it to determine whether any particular thirty-two bit address, specified by the master device 32, is one of the addresses in its associated memory region.

It should be noted that, in preferred embodiments of the invention, multiple address decoders 64 are provided in hard logic, at spaced apart locations within the gate array 20. The fact that the address decoders 64 are provided in hard logic avoids the need to implement the structures using the programmable logic elements. The optimum number of address decoders to be provided within the gate array 20 will depend on the size of the gate array, and the maximum number of slave devices which a user is likely to want to implement in the gate array. For example, even in the largest gate array, it is unlikely that a user will want to implement more than twenty slave devices, so it should be sufficient to provide twenty address decoders.

Then when allocating the desired functionality of the programmable logic device to the logic elements and logic array blocks 22, for example by routing software, care can be taken to ensure that one of the address decoders can be associated with each of the slave devices and memory devices.

It would be advantageous for the device to have more address decoders than the largest expected number of slave devices, to increase the efficiency with which the slave devices can be connected to the address decoders, at the time when the functionality is allocated to the programmable logic elements.

The address decoder 64 can be regarded as divided into three stages. The first stage is made up of twelve two-input AND gates 80, each of which receives one bit of the address on a respective first input 82 and a first bit of configuration data on a respective second input 84.

The second stage of the address decoder 64 is made up of twelve two-input XOR gates 86, each of which receives the output from an associated one of the AND gates 80 on a respective first input and a second bit of configuration data on a respective second input 88. The output of each of the XOR gates 86 is then passed to a respective inverter 90.

The third stage of the address decoder 64 is made up of a twelve-input AND gate 92, which receives the outputs from the inverters 90 on its respective inputs, and provides a signal on its output 94.

The first bits of configuration data, supplied to the second inputs 84 of the AND gates 80, serve to mask the least significant address bits. In this illustrated example, there are twelve AND gates 80, corresponding to the twelve most significant bits of the address, and each of the slave devices 26a, 26b, 26c, 26d and the memory blocks 28a, 28b is indicated by the twelve most significant address bits. As a result, a logic "1" is applied as configuration data to the second inputs 84 of each of the AND gates 80.

In other embodiments of the invention, there may be more than twelve AND gates 80. Alternatively, the address decoder 64, shown in FIG. 5, may be used in an implementation in which fewer than twelve of the address bits are used to identify the particular memory region. For example, if each of the address regions shown in FIG. 4 were to have a size of 4 Mbyte twenty-two bits would be required to define the addresses within it. This would mean that only ten bits would be available to identify the address regions. In that case, a logic "1" would be applied as configuration data to the second inputs 84 of only the first ten of the AND gates 80, with a logic "0" applied as configuration data to the second inputs 84 of the remaining two of the AND gates 80.

The logic of the address decoder 64 then operates such that, when a logic "1" is applied as configuration data to the second input 84 of one of the AND gates 80, a logic "1" appears on the output of the corresponding one of the inverters 90 only when the address bit on the corresponding first input 82 is equal to the second bit of configuration data on the respective input 88.

When a logic "0" is applied as the first bit of configuration data to the second input 84 of one of the AND gates 80, a logic "1" is applied as the second bit of configuration data on the respective corresponding input 88, in order to ensure that a logic "1" appears on the output of the corresponding one of the inverters 90.

Thus, having masked out those address bits which do not serve to identify the memory region, the remaining address bits are compared with configuration data which identify a specific memory region.

As mentioned above, one address decoder 64 is associated with each of the slave devices 26a, 26b, 26c, 26d and the memory blocks 28a, 28b, and the corresponding memory regions. Each of the address decoders is provided with the same first bits of configuration data, supplied to the corresponding second inputs 84 of the AND gates 80. However, each of the address decoders is provided with different second bits of configuration data, on the inputs 88.

That is, referring back to FIG. 4, the twelve inputs 88 connected to the twelve XOR gates 86 of the address decoder 64 for the first memory device 28a are provided with configuration bits corresponding to the twelve most significant bits of the addresses in that memory region, namely 000 in hexadecimal. Similarly, the twelve inputs 88 connected to the twelve XOR gates 86 of the address decoder 64 for the second memory device 28b are provided with configuration bits corresponding to the twelve most significant bits of the addresses in that memory region, namely 001 in hexadecimal; the twelve inputs 88 connected to the twelve XOR gates 86 of the address decoder 64 for the first slave device 26a are provided with configuration bits corresponding to the twelve most significant bits of the addresses in that memory region, namely ffc in hexadecimal; the twelve inputs 88 connected to the twelve XOR gates 86 of the address decoder 64 for the second slave device 26b are provided with configuration bits corresponding to the twelve most significant bits of the addresses in that memory region, namely ffd in hexadecimal; the twelve inputs 88 connected to the twelve XOR gates 86 of the address decoder 64 for the third slave device 26c are provided with configuration bits corresponding to the twelve most significant bits of the addresses in that memory region, namely ffe in hexadecimal; and the twelve inputs 88 connected to the twelve XOR gates 86 of the address decoder 64 for the fourth slave device 26d are provided with configuration bits corresponding to the twelve most significant bits of the addresses in that memory region, namely fff in hexadecimal.

Thus, in each of the address decoders 64, the twelve most significant bits address indicated by the bus master 32 are compared with the twelve most significant bits of the addresses in the memory region corresponding to that address decoder. In the one address decoder in which these bits match, the output signal on the twelve-input AND gate 92 becomes a logic "1".

This address decoder 64 then transmits this logic "1" to its associated device, either a slave device or a memory device, to indicate that that device should act on the data transferred from the bus master 32.

The remaining twenty bits of the address can be decoded in the relevant device in a conventional way. Alternatively, further address decoder structures, of the type shown in FIG. 5, can be provided to partially or completely further decode the address.

As described so far, the masking and comparison bits, supplied to the inputs 84 and 88 respectively of each address decoder 64, have been referred to as configuration data. This means that the relevant data is stored in the configuration memory 40, and is downloaded into the device whenever the system is started up. This will usually be acceptable, since the memory addresses allocated to the functional blocks in the device will usually be known when the functions are allocated to the elements in the gate array 20. However, the address decoding function could if necessary be made programmable, by supplying user data, possibly generated in operation of the device, as masking and comparison bits to the inputs 84 and 88 of each address decoder 64.

It should also be noted that the address decoder structure, shown in FIG. 5, could also be used for performing other functions. For example, by setting the comparison bits on the inputs 88 to a particular value, and providing a counter value to the address inputs 82, the structure could be used for determining when the counter value has reached the particular value specified by the comparison bits.

When multiple address decoders 64 are provided within a programmable logic device, and only some of them are being used as address decoders as shown in FIG. 3, then using the address decoders for this additional function is particularly useful, as it takes advantage of a structure which is already provided in the device.

The invention therefore provides a method and a device for decoding an address provided by a bus master in a programmable logic device.

What is claimed is:

1. A programmable logic device, comprising at least one address decoder, the or each address decoder comprising:
   a first stage, for receiving bits of an address, and for masking out a first group of least significant bits of said address;
   a second stage, for comparing a second group of most significant bits of said address with respective comparison bits; and
   a third stage, for providing an output when all of the bits in said second group of bits of said address match their respective comparison bits.

2. A programmable logic device as claimed in claim 1, wherein the first stage of the or each address decoder comprises a first number of first AND gates, each for receiving a respective one of said bits of said address, and each for receiving a masking bit determining whether said respective one of said bits of said address is to be masked out.

3. A programmable logic device as claimed in claim 2, wherein the second stage of the or each address decoder comprises a first number of XOR gates, each for receiving an output signal from a respective one of said first AND gates, and each for receiving a respective one of said comparison bits, the comparison bits supplied to the or each address decoder corresponding to the addresses associated with said address decoder.

4. A programmable logic device as claimed in claim 3, wherein the third stage of the or each address decoder comprises a second AND gate having a first number of inputs, each input receiving an inverted output from a respective one of said XOR gates, and said second AND gate providing an output when all of the bits in said second group of bits of said address match their respective comparison bits.

5. A programmable logic device as claimed in claim 1, comprising a plurality of address decoders in hard logic.

6. A programmable logic device as claimed in claim 1, comprising a gate array, and further comprising a plurality of said address decoders at spaced apart locations within said gate array.

7. A programmable logic device as claimed in claim 6, further comprising an embedded processor, said embedded processor being connected to said gate array by means of a bridge.

8. A programmable logic device, comprising:
an embedded processor; and
a field programmable gate array, comprising programmable logic elements,
wherein the field programmable gate array can be used to implement a bus structure and a plurality of slave devices, and the embedded processor can be used as a bus master connected to the bus structure, and
wherein the field programmable gate array further comprises a plurality of address decoders, implemented in hard logic at spaced apart locations within said gate array, such that each of said plurality of slave devices can be connected to a respective one of said plurality of address decoders.

9. A programmable logic device as claimed in claim 8, wherein each address decoder comprises:
a first stage, for receiving bits of an address from said bus master, and for masking out a first group of least significant bits of said address;
a second stage, for comparing a second group of most significant bits of said address with respective comparison bits; and
a third stage, for enabling data, associated with said address from said bus master, to be acted upon in the slave device associated with said address decoder, when all of the bits in said second group of bits of said address match their respective comparison bits.

10. A programmable logic device as claimed in claim 9, further comprising a configuration memory for supplying configuration data to said device, wherein the configuration memory is adapted to supply respective configuration data to each of said address decoders as said respective comparison bits.

11. A programmable logic device as claimed in claim 10, wherein the configuration memory is adapted to supply respective configuration data to each of said address decoders as said respective comparison bits, the respective configuration data supplied to each address decoder corresponding to the addresses associated with said address decoder.

12. A programmable logic device as claimed in claim 9, wherein the first stage of the or each address decoder comprises a first number of first AND gates, each for receiving a respective one of said bits of said address, and each for receiving a masking bit determining whether said respective one of said bits of said address is to be masked out.

13. A programmable logic device as claimed in claim 12, wherein the second stage of the or each address decoder comprises a first number of XOR gates, each for receiving an output signal from a respective one of said first AND gates, and each for receiving a respective one of said comparison bits, the comparison bits supplied to the or each address decoder corresponding to the addresses associated with said address decoder.

14. A programmable logic device as claimed in claim 13, wherein the third stage of the or each address decoder comprises a second AND gate having a first number of inputs, each input receiving an inverted output from a respective one of said XOR gates, and said second AND gate providing an output when all of the bits in said second group of bits of said address match their respective comparison bits.

15. In a programmable logic device, a method of decoding a received address, comprising:
receiving bits of an address, and masking out a first group of least significant bits of said address;
comparing a second group of most significant bits of said address with respective comparison bits; and
providing an output when all of the bits in said second group of bits of said address match their respective comparison bits.

16. A method as claimed in claim 15, comprising applying received bits of said address to respective first inputs of respective first AND gates, applying respective masking bits to respective second inputs of said respective first AND gates, and masking out received bits of said address which do not match their respective masking bits.

17. A method as claimed in claim 16, comprising applying the outputs of said respective first AND gates to respective first inputs of respective XOR gates, and applying respective comparison bits to respective second inputs of said respective XOR gates, the comparison bits supplied to the or each address decoder corresponding to the addresses associated with said address decoder.

18. A method as claimed in claim 17, comprising applying inverted output bits from said XOR gates to respective inputs of a second AND gate, said second AND gate providing an output when all of the bits in said second group of bits of said address match their respective comparison bits.

\* \* \* \* \*